Oct. 30, 1951 C. H. MANZLER 2,573,211
CHARCOAL STOVE
Filed June 25, 1948
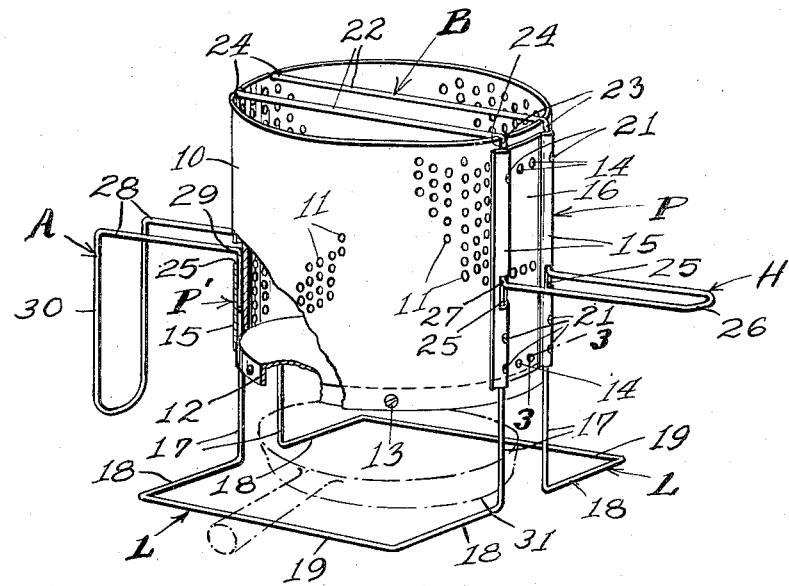
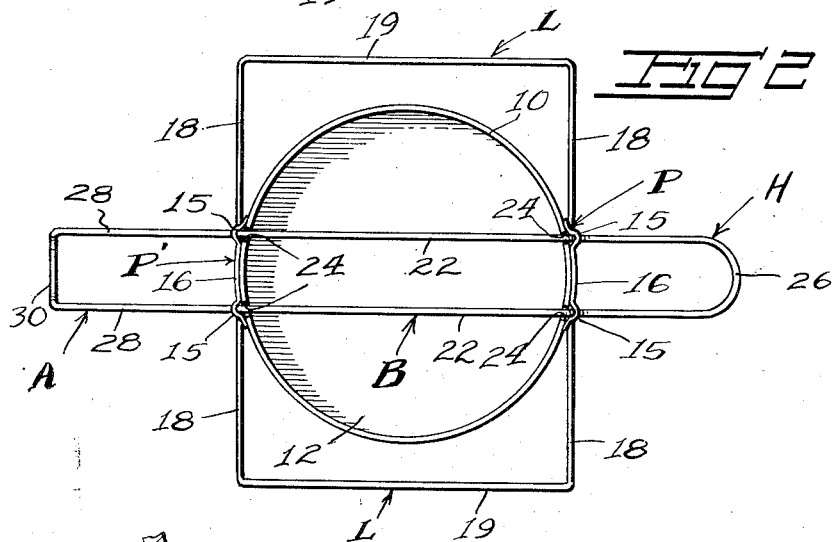
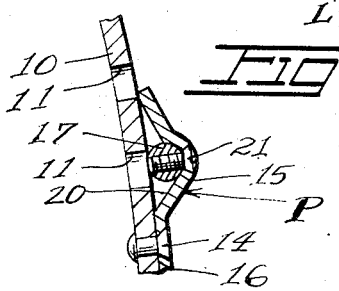
Inventor
Clarence H. Manzler
By Wilfred E. Lawson
ATTORNEY Patented Oct. 30, 1951

2,573,211

UNITED STATES PATENT OFFICE 2,573,211

CHARCOAL STOVE

Clarence H. Manzler, Rochester, N. Y.

Application June 25, 1948, Serial No. 35,211

4 Claims. (Cl. 126—25)

The invention relates to charcoal stoves and it is primarily an object of the invention to provide a charcoal burner or fire box having a vertical wall perforated over substantially the entire area thereof to facilitate a quick, sure-start fire without the aid of any other mechanical structure, such as a grate, and wherein the burning coals settle against the lower perforations to automatically check the fire to a long burning bed of hot coals especially adapted for broiling steaks and the like.

It is also an object of the invention to provide a burner or fire box which supplies heat above the burner or fire box for broiling and heating below the burner or fire box for broiling, baking or warming whereby is practically doubled, the cooking capacity of a burner or fire box of a given size.

The invention also has for an object to provide a burner or fire box which permits of a wide range of cooking operations, such as broiling meats without losing the juices and baking biscuits.

A still further object of the invention is to provide a burner or fire box adapted to be supported as desired at a predetermined elevation so that food may be cooked or maintained warm by the heat radiating or reflecting from the bottom wall of the burner or fire box which is preferably imperforate.

Furthermore, it is an object of the invention to provide a charcoal burner or fire box equipped with supports to prevent accidental tipping of the same, particularly when used on a beach or the like and permitting the use of a warming pan therebeneath practically of the same diameter as the stove.

Another object of the invention is to provide a charcoal burner or fire box equipped with a handle adapted to support suitable objects, such as salt and pepper containers and the like, and with a stand or bracket on which a coffee pot or the like may be held.

The invention consists in the details of construction and in the combination of the several parts of my improved charcoal stove whereby certain advantages are attained, as will be hereinafter more fully set forth.

In order that my invention may be better understood I will now proceed to describe the same with reference to the accompanying drawings, wherein:

Figure 1 is a view in perspective of a charcoal stove constructed in accordance with an embodiment of the invention, a part being broken away.

Figure 2 is a top plan view of Figure 1; and

Figure 3 is a fragmentary sectional view taken substantially on the line 3—3 of Figure 2.

The charcoal stove embodied herein comprises a fire box B having a vertical wall 10 preferably made from steel plate or the like provided substantially over its entire area with perforations 11. While the fire box B is illustrated substantially cylindrical, it is to be understood that it may be made in any other desired shape. The fire box B is open at its top and a bottom wall 12 is set into the lower end portion of the box B and is secured to the walls of the box in any conventional manner, as by screws 13. The bottom 12 is imperforate.

A plate P is secured to the wall 10 of the fire box B by means of rivets 14 or otherwise as may be preferred. The plate P is relatively narrow and extends substantially from the bottom to the top of the wall 10 and is provided adjacent to each of its vertical edges with an outwardly projecting corrugation 15, extending over the entire length of the plate P. The middle portion 16 of the plate P abuts the wall 10 of the fire box B and the rivets 14 extend through this middle portion and the wall 10. A second plate P' in duplicate of plate P, is secured to the wall 10 at a point diametrically opposed to the plate P.

A pair of legs L are made from steel rods or the like, and each leg is made preferably from a continuous rod bent so that it comprises two upwardly extending shanks 17, a horizontal foot portion 18 projecting outwardly from the lower end of each shank 17, and a horizontal front foot portion 19 connecting the outer ends of the foot portions 18. The shanks 17 of one leg L are inserted from below into the channels 20 formed by the corrugations 15 of the plate P and the shanks 17 of the second leg L are inserted from below in the channels 20 of the second plate P'. Countersunk screws 21 extend through the corrugations 15 and engage the shanks 17 to hold the legs L in applied position.

A pair of top rods R are provided, and each top rod R comprises a straight main portion 22 and two end portions 23 bent downwardly at substantially right angles. The top rods R are mounted on top of the fire box B by inserting from above the rod end portions 23 into the channels 20 of the plates P and P', so that the main rod portions 22 extend in parallelism across the fire box. Notches 24 are arranged in the top edge to receive the extremities of the rods R so that the said rods will be entirely below the top of the box B.

Approximately central of the corrugations 15 of the plates P and P' the longitudinal slots 25 are provided. A handle H is formed from a continuous rod bent to form a substantially U-shaped grip portion 26 having end portions 27 which extend upwardly at right angles to the main grip portion. When it is desired to lift or move the charcoal burner or stove B, the handle H is attached to the wall 10 by inserting the upwardly extending handle end portions 27 into the channels 20 of the plate P or P', through the slots 25 in the wall of the corrugations 15 thereof.

A bracket A is also made from a continuous rod formed to provide two arms 28 of approximately equal lengths extend parallel to each other. The free or rear end portions 29 and the connected front end portions 30 of the arms are bent to extend at right angles to the middle portions of the arms 28 in the same direction. The bracket A is attached to the box B by inserting the free end arm portions 29 into the channels 20 through the slots 25 of a plate P or P'. When the bracket A is applied to the burner or box B, the depending outer portion 30 constitutes a leg of a length to engage the surface upon which the burner or box B is positioned to assure proper maintenance of the load upon the horizontal arms 29.

When the fire box B is filled with charcoal and the latter is ignited, the continuously flowing draft passing through the perforations 11 insures a quick start of a steadily burning fire without the necessity of creating a draft by fanning or the like. As the burning coals settle, they automatically close the lower perforations, keeping a long burning bed of hot coals, which is especially adapted for broiling steaks or the like. The expansion of the fire box walls through the heat is equalized by the perforations in said walls, so that any warping and buckling of the walls is prevented.

The top rods R are adapted to support a broiling grill (not shown) or the like and the bracket B can support a coffee pot (not shown) or the like, which is to be kept warm. A broiling pan 31 indicated in broken lines in Figure 1, can be placed under the fire box 10, the construction of the legs L permitting the use of a pan nearly as large in diameter as the fire box. Since the bottom 12 is solid, ashes or the like are prevented from falling into a warming pen located under the fire box. The wide spread of the legs L substantially eliminates the possibility of accidental tipping of the burner or fire box.

From the foregoing description it is thought to be obvious that a charcoal stove constructed in accordance with my invention is particularly well adapted for use by reason of the convenience and facility with which it may be assembled and operated.

I claim:

1. A charcoal burner comprising a flat base consisting of horizontally disposed frames each having two spaced uprights rising therefrom, the uprights of one frame being in relatively close parallel relation with those of the other frame forming two pairs of uprights, a firebox supported between said two pairs of uprights above said base, said firebox having an open top, a solid bottom and a perforated side wall, means on opposite sides of said firebox securing adjacent portions of said uprights to the firebox, a pair of inverted U-shaped members straddled over the open top of said firebox and having the side portions thereof secured to the firebox by the said upright securing means in line with said uprights, and a handle having a pair of angled attaching portions detachably secured to one side of said firebox between and in line with the adjacent ends of said uprights and of the side portions of said U-shaped members.

2. The invention as defined in claim 1, with the said securing means permanently mounted on said firebox and adapted to be detachably engaged by the said uprights, the side portions of said U-shaped members, and the angled portions of said handle.

3. The invention as defined in claim 1, wherein each frame of the said base comprises a length of wire bent to provide horzontally disposed U-shaped portions having the free ends of the side portions thereof upturned to provide the said uprights.

4. The invention as defined in claim 1, with the said securing means each comprising a vertically elongated metal plate permanently mounted on a side of said firebox and having its side edges bent to form inwardly open channels adapted to be detachably engaged by the said uprights, the side portions of said U-shaped members, and the angled portions of said handle, and screws threaded inwardly of said plate and engageable with engaged portions of said uprights and with the like portions of said U-shaped members to retain the same semi-permanently in place within said channels.

CLARENCE H. MANZLER.

REFERENCES CITED

The following references are of record in the file of this patent:

UNITED STATES PATENTS

| Number | Name | Date |
|---|---|---|
| 756,330 | Clergy | Apr. 5, 1904 |
| 922,503 | Perelzveich | May 25, 1909 |
| 1,463,541 | Andrews | July 31, 1923 |
| 2,048,769 | Anderson | July 28, 1936 |
| 2,158,236 | Haislip | May 16, 1939 |
| 2,158,805 | Smith | May 16, 1939 |
| 2,201,756 | Avetta | May 21, 1940 |
| 2,325,077 | Robinson | July 27, 1943 |
| 2,334,847 | Spiers | Nov. 23, 1943 |
| 2,477,529 | Sprinkle | July 26, 1949 |